(12) United States Patent
Romanov (10) Patent No.: US 10,077,672 B2
(45) Date of Patent: Sep. 18, 2018

(54) RING-SHAPED COMPLIANT SUPPORT

(71) Applicant: United Technologies Corporation, Hartford, CT (US)

(72) Inventor: Dmitriy A. Romanov, Wells, ME (US)

(73) Assignee: United Technologies Corporation, Farmington, CT (US)

( * ) Notice: Subject to any disclaimer, the term of this patent is extended or adjusted under 35 U.S.C. 154(b) by 387 days.

(21) Appl. No.: 14/773,190

(22) PCT Filed: Feb. 18, 2014

(86) PCT No.: PCT/US2014/016761
§ 371 (c)(1),
(2) Date: Sep. 4, 2015

(87) PCT Pub. No.: WO2014/137577
PCT Pub. Date: Sep. 12, 2014

(65) Prior Publication Data
US 2016/0010484 A1    Jan. 14, 2016

Related U.S. Application Data

(60) Provisional application No. 61/774,637, filed on Mar. 8, 2013.

(51) Int. Cl.
*F01D 11/16* (2006.01)
*F01D 11/18* (2006.01)
(Continued)

(52) U.S. Cl.
CPC .............. *F01D 11/16* (2013.01); *F01D 11/18* (2013.01); *F01D 25/14* (2013.01); *F01D 25/24* (2013.01);
(Continued)

(58) Field of Classification Search
CPC ...... F01D 25/24; F01D 25/28; F05D 2220/32; F05D 2240/10; F05D 2240/20; F05D 2240/55
See application file for complete search history.

(56) References Cited

U.S. PATENT DOCUMENTS 3,860,358 A * 1/1975 Cavicchi ................. F01D 11/08
277/411
3,975,114 A * 8/1976 Kalkbrenner ......... F01D 11/005
277/643
(Continued)

FOREIGN PATENT DOCUMENTS

EP          0076256       4/1983
EP          1890009       2/2008
(Continued)

OTHER PUBLICATIONS

European Search Report for Application No. 14759734.8 dated Sep. 16, 2016.
(Continued)

*Primary Examiner* — Patrick Maines
(74) *Attorney, Agent, or Firm* — Carlson, Gaskey & Olds, P.C.

(57) ABSTRACT

A ring-shaped compliant support for a gas turbine engine includes, among other things, an annular case, and an adjustment member that will turn relative to the annular case if exposed to thermal energy.

18 Claims, 8 Drawing Sheets

(51) Int. Cl.
F01D 25/14 (2006.01)
F01D 25/24 (2006.01)
F01D 25/26 (2006.01)
F01D 25/28 (2006.01)

(52) U.S. Cl.
CPC ......... *F01D 25/243* (2013.01); *F01D 25/246* (2013.01); *F01D 25/26* (2013.01); *F01D 25/265* (2013.01); *F01D 25/28* (2013.01); *F05D 2220/32* (2013.01); *F05D 2240/10* (2013.01); *F05D 2240/20* (2013.01); *F05D 2240/55* (2013.01); *Y02T 50/675* (2013.01)

(56) References Cited

U.S. PATENT DOCUMENTS

| | | | | |
|---|---|---|---|---|
| 4,127,357 | A * | 11/1978 | Patterson | F01D 11/22 415/116 |
| 4,247,248 | A | 1/1981 | Chaplin et al. | |
| 4,485,620 | A * | 12/1984 | Koenig | F01D 9/023 415/116 |
| 4,752,184 | A * | 6/1988 | Liang | F01D 11/08 415/116 |
| 4,971,336 | A * | 11/1990 | Ferguson | F16J 15/3288 277/355 |
| 5,176,389 | A * | 1/1993 | Noone | F16J 15/3288 277/355 |
| 5,593,278 | A | 1/1997 | Jourdain et al. | |
| 7,621,719 | B2 | 11/2009 | Lutjen et al. | |
| 7,988,410 | B1 | 8/2011 | Liang | |
| 8,061,979 | B1 | 11/2011 | Liang | |
| 2003/0202876 | A1 | 10/2003 | Jasklowski et al. | |
| 2004/0018084 | A1 * | 1/2004 | Halliwell | F01D 5/225 415/173.1 |
| 2007/0264120 | A1 * | 11/2007 | Amiot | F01D 11/24 415/173.2 |
| 2009/0142180 | A1 * | 6/2009 | Munson | F01D 11/001 415/111 |
| 2010/0232940 | A1 | 9/2010 | Ammann | |
| 2012/0027574 | A1 | 2/2012 | Belanger et al. | |
| 2012/0189426 | A1 * | 7/2012 | Thibodeau | F01D 11/08 415/1 |
| 2012/0275898 | A1 | 11/2012 | McCaffrey et al. | |
| 2014/0030066 | A1 * | 1/2014 | Schimmels | F01D 11/24 415/116 |
| 2014/0140828 | A1 * | 5/2014 | Rioux | F04D 19/02 415/175 |
| 2016/0177768 | A1 * | 6/2016 | Borja | F01D 5/02 415/134 |
| 2016/0312643 | A1 * | 10/2016 | Davis | F01D 11/18 |

FOREIGN PATENT DOCUMENTS

| | | |
|---|---|---|
| EP | 1965030 | 9/2008 |
| GB | 2166805 | 5/1986 |
| JP | 09013907 A | 1/1997 |
| WO | 8203657 | 10/1982 |

OTHER PUBLICATIONS

International Preliminary Report on Patentability for PCT Application No. PCT/US2014/016761, dated Sep. 11, 2015.
International Search Report and Written Opinion for International Application No. PCT/US2014/016761 dated May 21, 2014.

* cited by examiner

RING-SHAPED COMPLIANT SUPPORT

BACKGROUND

This disclosure relates to supporting components of a gas turbine engine.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The turbine section of a gas turbine engine typically include alternating rows of rotating blades and stationary vanes. The turbine blades rotate and extract energy from the hot combustion gases that are communicated through the gas turbine engine. The turbine vanes prepare the airflow for the next set of blades. The vanes extend from platforms that may be contoured to manipulate flow. An outer casing of an engine static structure may include one or more blade outer air seals (BOAS) that sit outwardly of the blades and provide an outer radial flow path boundary for the hot combustion gases.

Vanes, BOAS, and other components are typically found at locations circumferentially surrounding a center axis of the gas turbine engines. The thermal energy level at a given axial position can vary across circumferential positions. Thus, one circumferential location may be hotter than others, due to any number of factors in the manufacturing of the gas turbine engine. The blades rotate across the entire circumferential extent, and thus each experience hotter and less hot areas. The BOAS and vanes, however, are generally stationary and thus some may sit in the hotter positions. This may lead to uneven wear of vanes, BOAS, and other gas turbine engine components.

SUMMARY

A ring-shaped compliant support for a gas turbine engine according to an exemplary aspect of the present disclosure includes, among other things, an annular case, and an adjustment member that will turn relative to the annular case if exposed to thermal energy.

In a further non-limiting embodiment of the foregoing ring-shaped compliant support, the annular case defines a bore and the adjustment member is received within the bore.

In a further non-limiting embodiment of any of the foregoing ring-shaped compliant supports, the adjustment member comprises a plurality of wings extending radially and circumferentially from a ring.

In a further non-limiting embodiment of any of the foregoing ring-shaped compliant supports, slots in the adjustment member separate the plurality of wings from each other.

In a further non-limiting embodiment of any of the foregoing ring-shaped compliant supports, the plurality of wings comprises a first array of wings extending radially and circumferentially from the ring, and a second array of wings extending radially and circumferentially from the ring.

In a further non-limiting embodiment of any of the foregoing ring-shaped compliant supports, the first array of wings are axially sequentially aligned with the second array of wings.

In a further non-limiting embodiment of any of the foregoing ring-shaped compliant supports, the wings in the first array are axially thinner than the wings in the second array.

In a further non-limiting embodiment of any of the foregoing ring-shaped compliant supports, the wings in the first array are upstream from the wings in the second array.

In a further non-limiting embodiment of any of the foregoing ring-shaped compliant supports, the wings in the first array are relatively insulated and the wings in the second array are relatively uninsulated.

In a further non-limiting embodiment of any of the foregoing ring-shaped compliant supports, the wings in the first array are upstream from the wings in the second array.

In a further non-limiting embodiment of any of the foregoing ring-shaped compliant supports, the wings in the first array are axially thinner than the wings in the second array.

In a further non-limiting embodiment of any of the foregoing ring-shaped compliant supports, the wings elongate in response to thermal variations.

In a further non-limiting embodiment of any of the foregoing ring-shaped compliant supports, the adjustment member and the annular case have different rates of thermal expansion, such that the adjustment member expands more quickly than the annular case in response to thermal energy.

A ring-shaped compliant support according to another exemplary aspect of the present disclosure includes, among other things, an annular case, an adjustment member, and a gas turbine engine component and configured to turn with the adjustment member or the annular case relative to the other of the adjustment member or the annular case in response to thermal energy.

In a further non-limiting embodiment of the foregoing ring-shaped compliant support, the gas turbine engine component is a blade outer air seal.

In a further non-limiting embodiment of any of the foregoing ring-shaped compliant supports, the gas turbine engine component is secured to the adjustment member and is radially inside both the annular case and the adjustment member.

A method of moving a gas turbine engine component according to yet another exemplary aspect of the present disclosure includes, among other things, exposing an annular case and an adjustment member to thermal energy to turn the adjustment member relative to the annual case about a central axis of a gas turbine engine, and supporting a gas turbine engine component with the adjustment member.

In a further non-limiting embodiment of the foregoing method, the gas turbine engine component comprises a blade outer air seal.

In a further non-limiting embodiment of either of the foregoing methods, the method includes expanding portions of the adjustment member against an annular case to initiate rotation.

Although the different examples have the specific components shown in the illustrations, embodiments of this disclosure are not limited to those particular combinations. It is possible to use some of the components or features from one of the examples in combination with features or components from another one of the examples.

DETAILED DESCRIPTION

Figure 1:
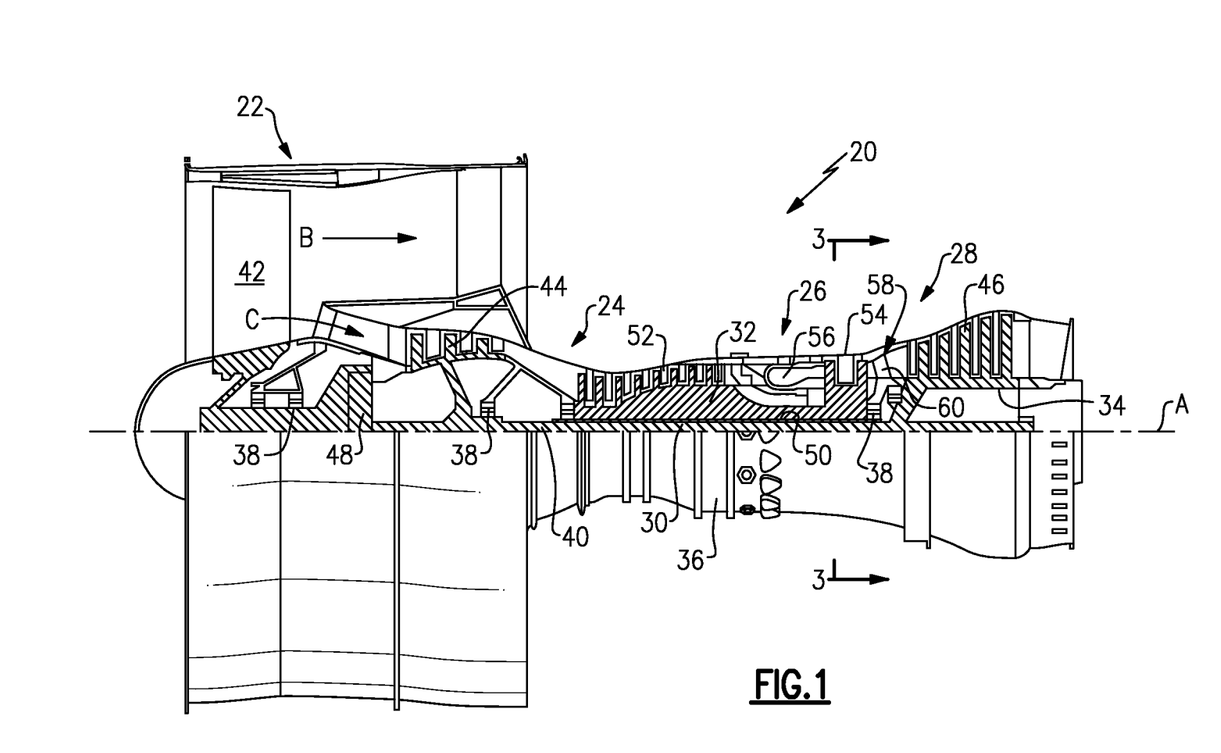
FIG. 1 is a schematic, cross-sectional view of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high temperature exhaust gas stream that expands through the turbine section 28 where energy is extracted and utilized to drive the fan section 22 and the compressor section 24.

Although depicted as a two-spool turbofan gas turbine engine in the disclosed non-limiting embodiment, it should be understood that the concepts described herein are not limited to use with two-spool turbofans as the teachings may be applied to other types of turbine engines including direct drive and three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric to one another and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44, then by the high pressure compressor 52, then mixed with fuel and ignited in the combustor 56 to produce high temperature exhaust gases that are then expanded through the high pressure turbine 54 and low pressure turbine 46. The mid-turbine frame 58 includes vanes 60 that are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 favorably shortens the axial length of the turbine section 28. Thus, the compactness of the gas turbine engine 20 is increased and a higher power density may be achieved.

The disclosed gas turbine engine 20, in one example, is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as bucket cruise Thrust Specific Fuel Consumption (TSFC)—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^0.5$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
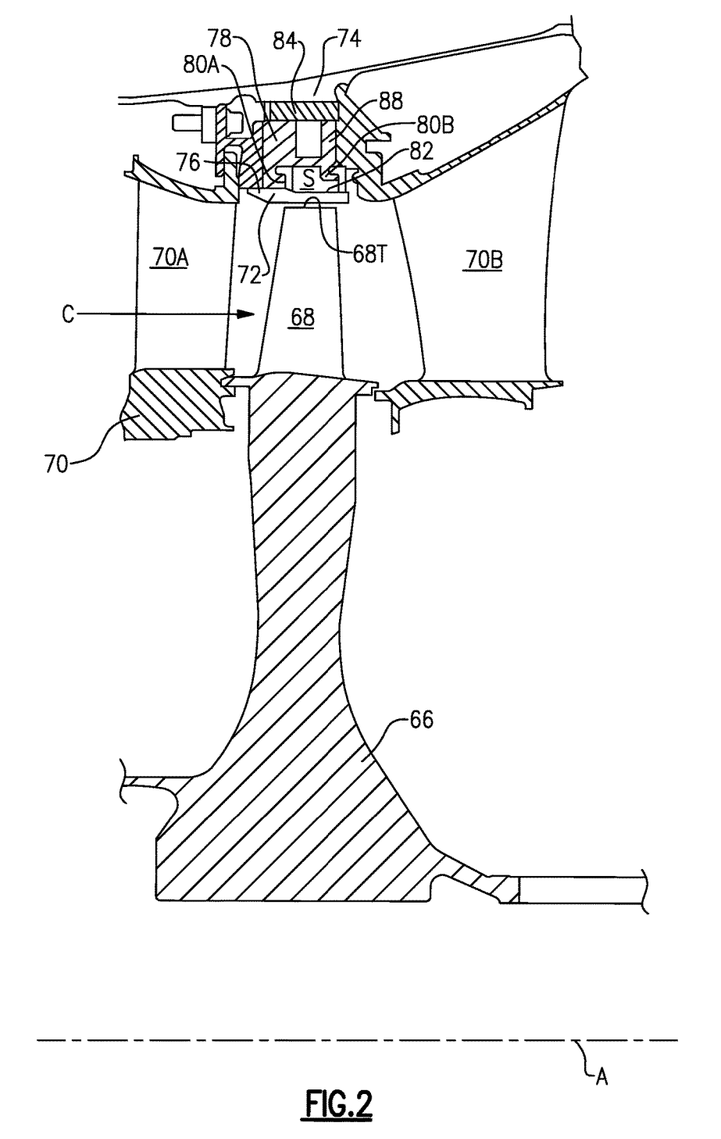
FIG. 2 is a cross-section of an area the gas turbine engine having a compliant support.
Figure 3:
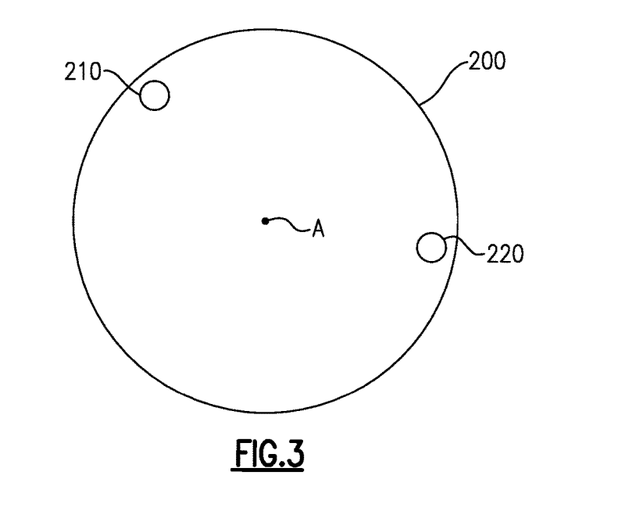
FIG. 3 is a highly schematic section view of the area at line 2-2 in FIG. 1.

Referring now to FIGS. 2 and 3 with continuing reference to FIG. 1, components of the gas turbine engine 20 include a rotor disk 66, a blade 68, vanes 70A, 70B, and a Blade Outer Air Seal (BOAS) 72. In this exemplary embodiment, the components are part of the high pressure turbine 54. However, it should be understood that other portions of the gas turbine engine 20 could benefit from the teachings of this disclosure, including but not limited to, the compressor section 24 and the low pressure turbine 46.

The high pressure turbine section 54 has a cross section 200. During operation, area 210 of the cross-section may be hotter than area 220. Components that rotate about the axis, such as the rotor disk 66 and the blade 68, rotate through both the areas during operation. The rotating components experience relatively even wear.

If components do not rotate, the components may wear differently depending on their proximity to the relatively hot 220 or the less hot area 210. The examples of this disclosure cause typically non-rotating components to rotate. This lessens variations in wear due to the area 220 being hotter than the area 210.

In this exemplary embodiment, the rotor disk 66 (only one shown, although multiple disks could be used) is mounted to the outer shaft 50 and rotates as a unit with respect to the engine static structure 36. Alternating rows of the rotating blades 68 are mounted to the rotor disk 66. The vanes 70A and 70B of vane assemblies 70 are also supported within an outer casing 74 of the engine static structure 36.

Each blade 68 includes a blade tip 68T that is positioned at a radially outermost portion of the blades 68. The blade tip 68T extends toward the BOAS 72.

The BOAS 72 is disposed in an annulus radially between the outer casing 74 and the blade tip 68T. The BOAS 72 generally includes a multitude of BOAS segments 76 (only one shown in FIG. 2). The BOAS segments 76 may form a full ring hoop assembly that encircles associated blades 68 of a stage.

The BOAS 72, a type of gas turbine engine component, is held by a ring-shaped compliant support assembly 78 that is mounted radially inward from the outer casing 74. The support 78 can include forward and aft flanges 80A, 80B that mountably receive the BOAS segments 76. The forward flange 80A and the aft flange 80B may be manufactured of a metallic alloy material and may be circumferentially segmented for the receipt of the BOAS segments 76.

The support 78 defines a cavity 82 that spans axially between the forward flange 80A and the aft flange 80B and radially between the support 78 and the BOAS segment 76. A secondary cooling airflow S may be communicated into the cavity 82 to provide a dedicated source of cooling airflow for cooling the BOAS segments 76. The secondary cooling airflow S can be sourced from the high pressure compressor 52 or any other upstream portion of the gas turbine engine 20.

Referring now to FIGS. 4-11 with continuing reference to FIGS. 1 and 2, the example support 78 includes an annular or ring-shaped case 84 and an adjustment member 88. The annular case 84 may form a portion of the outer casing 74. The annular case 84 defines a bore 90 that receives the adjustment member 88. The diameter of the bore 90 is closely matched to the outer diameter of the adjustment member 88. In some examples, the adjustment member 88 is oversized relative to the bore 90 such that the adjustment member 88 is secured within the annular case 84 via an interference fit. The tight fit provides a large frictional force between the adjustment member 88 and the annular case 84. The adjustment member 88 may include the flanges 80A and 80B.

Figure 4:
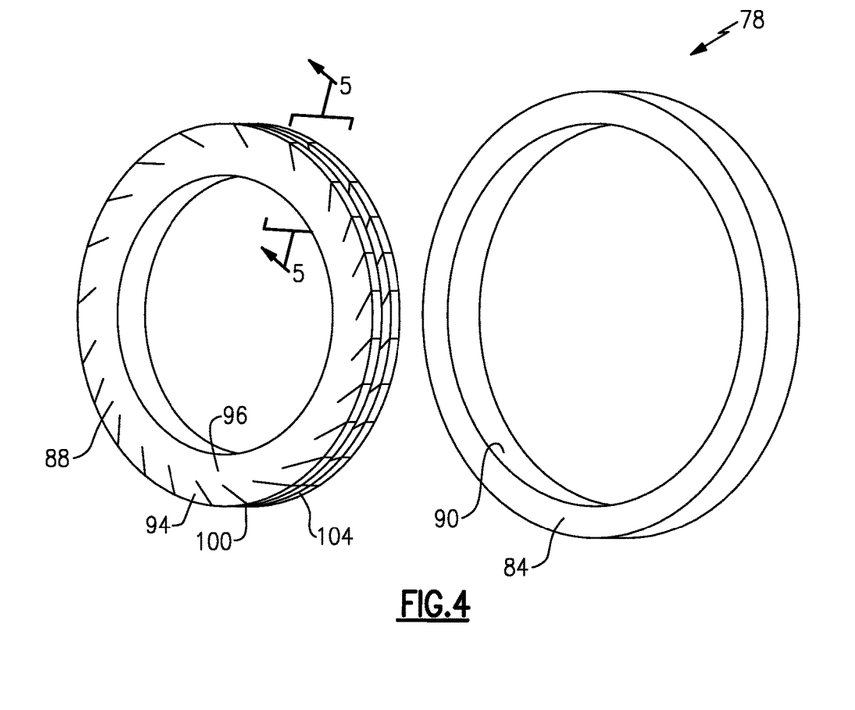
FIG. 4 shows an exploded schematic view of the compliant support of FIG. 3.
Figure 5:
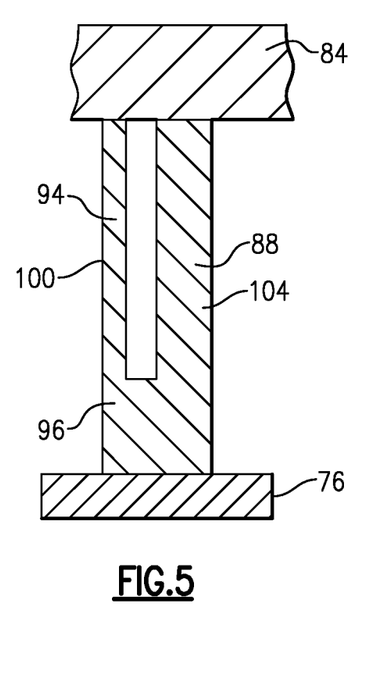
FIG. 5 is a section view at line 5-5 in FIG. 4.

The example adjustment member 88 includes wings 94 extending radially and circumferentially from a ring 96. Slots 98 are defined within the adjustment member 88 to define the wings 94. The example slots 98 have an angle α from 30 to 75 degrees from a radial direction R when the engine 20 is at rest.

The adjustment member 88 includes a first array 100 of the wings 94 and a second array 104 of the wings 94. The first array 100 is axially upstream from the second array 104 relative to a direction of flow through the engine. The first array 100 and the second array 104 are arranged in an axially sequential manner. The first array 100 is movable relative to the second array 104.

In some examples, the first array 100 and the second array 104 are machined from separate pieces of material. The rings 96 of the separate pieces are then secured directly to each other to form the adjustment member 88.

The adjustment member 88 is made of a first material. The annular case 84 is made of a second material. The first material has a high coefficient of thermal expansion relative to the second material. Example first materials include nickel alloy and steel.

Figure 6:
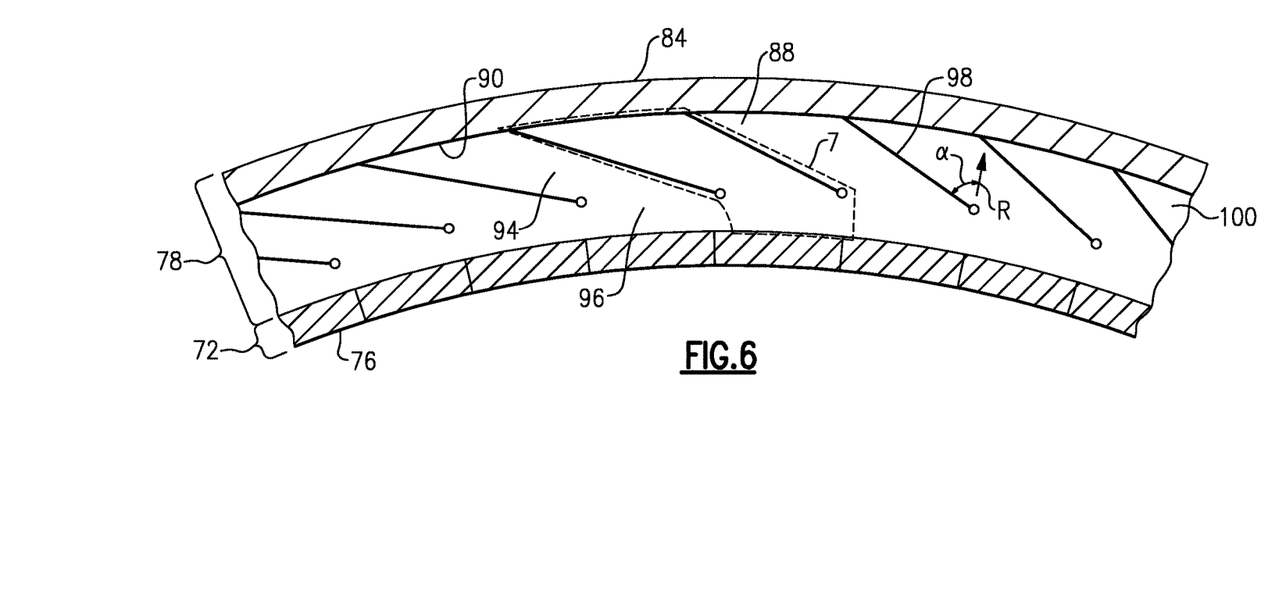
FIG. 6 shows a portion of the compliant support at an initial position.
Figure 7:
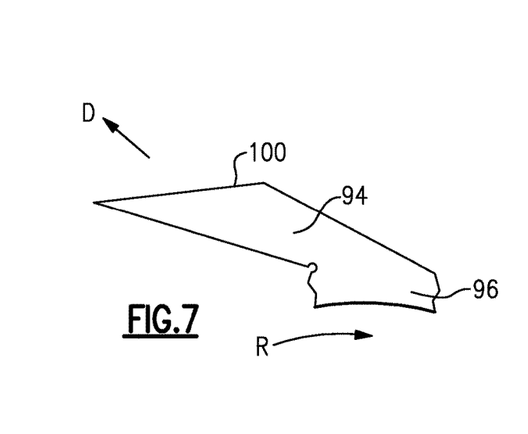
FIG. 7 shows an area 7 of the compliant support of FIG. 6.

During an operational cycle of the engine 20, the support 78 is exposed to elevated temperatures. The adjustment member 88 expands in response to thermal energy levels more quickly than the ring 96. In this example, expansion of the adjustment member 88 causes the wings 94 to push, in the direction D, against the annular case 84.

Expansion in the direction D is limited by the annular case 84. Relative to the adjustment member 88, the annular case 84 expands very little, if at all. Thus, the forces exerted in the direction D cause the adjustment member 88, and particularly the ring 96, to rotate in a direction R relative to the annular case 84. The forces exerted in the direction D overcome any circumferential loading exerted on the adjustment member 88 by the attached gas turbine engine component.

The adjustment member 88 rotates from an initial position shown in FIG. 6. The BOAS segments 76 are attached to the ring 96 of the adjustment member 88. Rotating the adjustment member 88 thus rotates the BOAS segments 76 in the direction R. The rotation of the BOAS segments 76 from the start position may be very small, such as less than a millimeter. In some examples, the amount of rotation during an acceleration and deceleration of the engine 20 is about 0.0127 millimeters.

During cool down of the engine 20, the wings 94 contract. The first array 100 and the second array 104 expand and contract at different rates to help prevent the adjustment member 88 and the BOAS segments 76 from rotating back to the inital position during a cool down.

In this example, the first array 100 of wings 94 is axially thinner than the second array 104 of wings 94. During a thermal cycle, the thinner wings 94 in the first array 100 will expand faster than the thicker wings 94 in the second array 104. The wings 94 in the first array 100 will also contract during cool down, faster than the wings 94 in the second array 104. The wings 94 attached to the same circumferential location of the ring 96 thus become circumferentially misaligned during some portion of a thermal cycle, which facilitates movement in the direction R.

Figure 8:
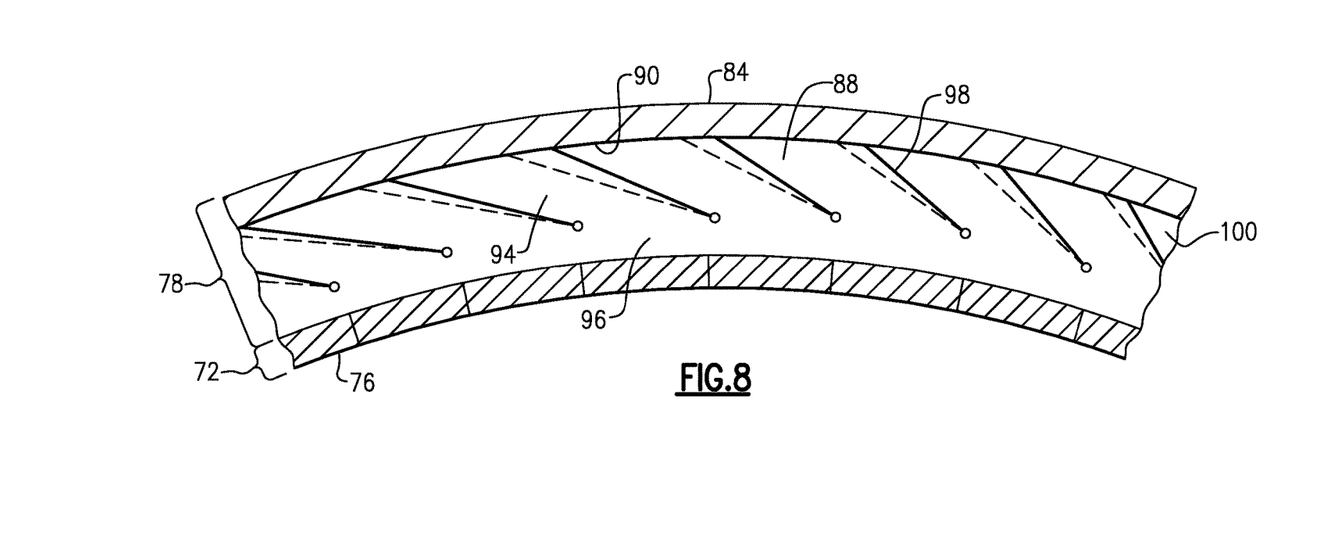
FIG. 8 shows the FIG. 6 portion of the compliant support at a position subsequent to the initial position.
Figure 9:
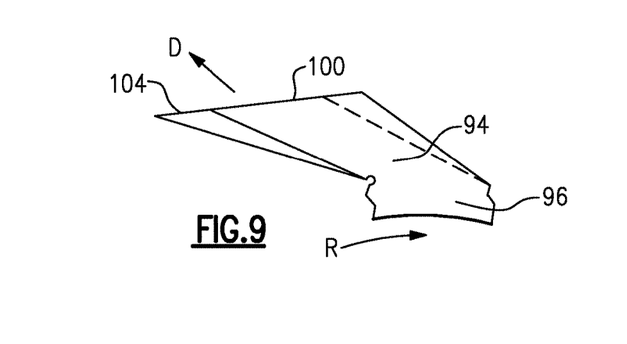
FIG. 9 shows the area 7 at the position subsequent to the initial position.

FIGS. 8 and 9 show the wings 94 during a cool down of the engine 20. As shown, the wings 94 in the first array 100 are retracted more than the wing in the second array 104. The wings 94 that have retracted slip in the direction R relative to the annular case 84. The wings 94 that have retracted slip along the annular case 84 and interface with a different surface of the annular case 84. Notably, the wings 94 in the second array 104, which are relatively expanded, prevent the ring 96 from returning to the start position when the wings 94 in the first array 100 contract. The amount of slippage corresponds generally to the difference in expansion between the wings 94 of the first array 100 and the wings 94 of the second array 104.

Figure 10:
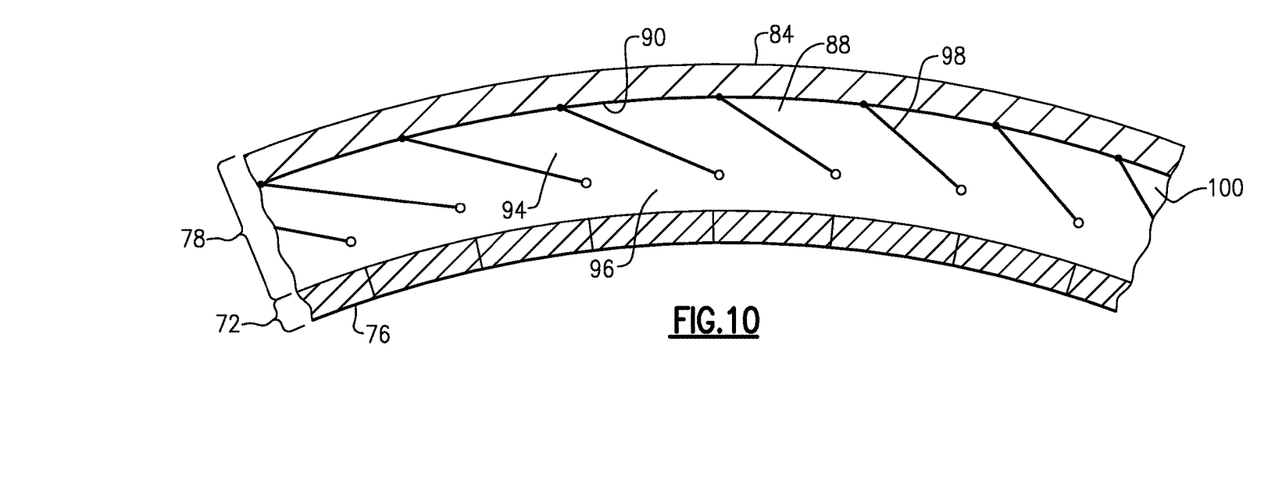
FIG. 10 shows the FIG. 6 portion of the compliant support at a final position.
Figure 11:
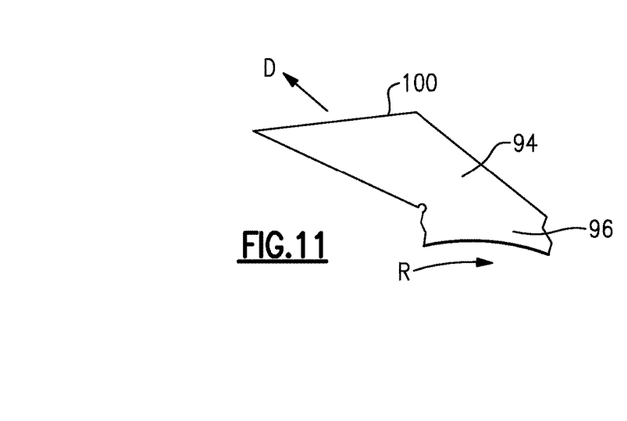
FIG. 11 shows the area 7 at the final position.

After more cooling, the wings 94 in the second array 104 retract. The wings 94 in the first array 100 prevent the ring 96 from returning to the start position when the wings 94 in the first array 100 contract.

During a warm up of the engine 20, the wings 94 in the first array 100 expand relative to the wings 94 in the second array 104. This causes the wings 94 in the second array 104 to slip relative to the wings 94 in the first array 100.

The wings 94 effectively walk, creep, or crawl the adjustment member 88 in the direction R around the axis A to cause the BOAS 72 to turn relative to the annular case 84. Thermal energy cycles of the engine 20 are responsible for the rotation. After the successive thermal energy cycles, the BOAS 72 may rotate further and further about the axis A. In so doing, the circumferential position of the BOAS segment 76 within the engine 20 changes over time. Damage due to hot spots at particular circumferential positions is thus lessened or eliminated.

In this example, the adjustment member 88 is radially inside the annular case 84. In other examples, the adjustment member 88 could be radially outside the annular case 84.

In this example, the BOAS 72, a type of gas turbine engine component, is attached to the adjustment member 88. In another example, the gas turbine engine component may be instead attached to the annular case 84. In such an example, exposure to thermal energy may turn the annular case 84 rather than the adjustment member 88.

Figure 12:
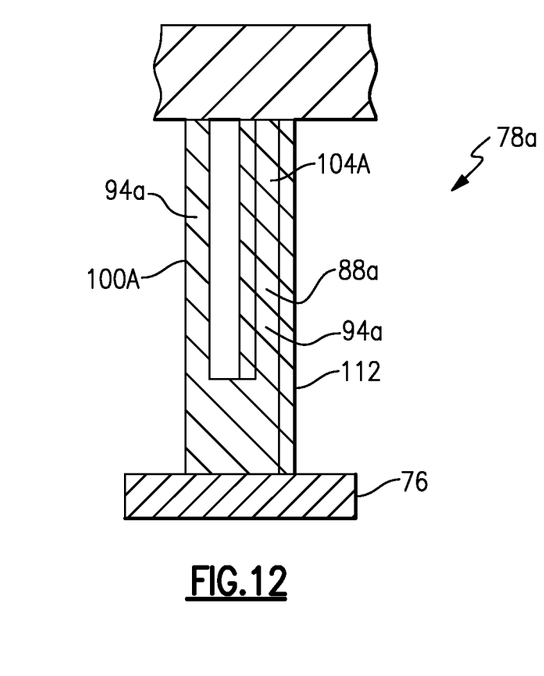
FIG. 12 is a section view of a second embodiment similar to FIG. 5.

Referring to FIG. 12, in another example support 78a, an adjustment member 88a includes a first array 100a of wings 94a and a second array 104a of wings 94a. The wings 94a in the first array 100a and second array 104a have the same axial thickness. The wings 94a in the second array 104a are coated with a thermally protective barrier coating 112. The coating 112 causes the wings 94a in the second array 104a to heat and cool at a different rate that the wings in the first array 100a.

In other examples, the wings are approximately the same size, and have the same coefficient of expansion, one side, however, is exposed to the air stream and another is insulated. One array of the wings is thus more exposed to a hotter area of the engine 20, than the other array. The more exposed array of wings heats faster than the other array of wings.

Figure 13:
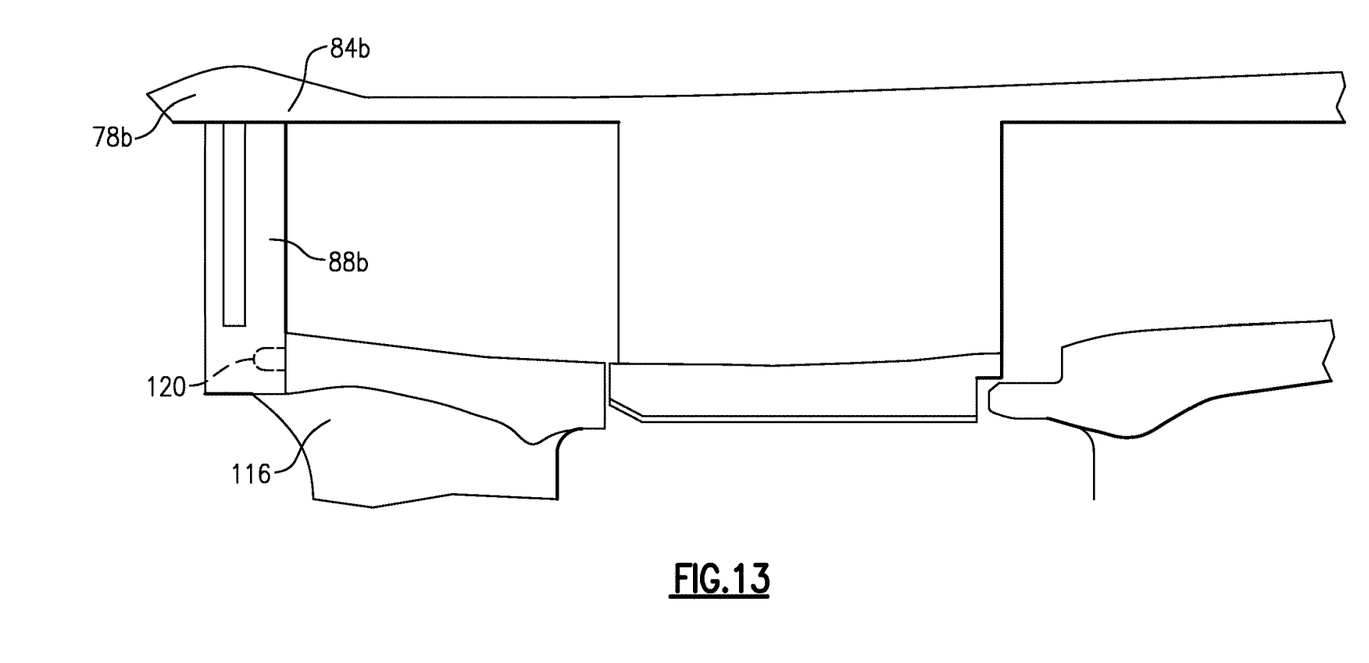
FIG. 13 is a cross-section view of another embodiment of the compliant support of FIG. 4.

Referring to FIG. 13, another example support 78b is used to support another type of turbine engine component, such as a vane assembly 116. The support 78b includes an annular case 84b and an adjustment member 88b. An attachment member 120 secures a front end of the vane assembly 116 to the adjustment member 88b. A back end of the vane assembly 116 is not directly secured to any fixed structure and follows the rotations of the front end by the support 78b.

Features of the disclosed examples include rotating a component using a compliant assembly. The component ordinarily having a fixed circumferential position to avoid thermal energy damage. The compliant assembly may find beneficial use in many industries including aerospace, industrial, electricity generation, naval propulsion, pumps for gas and oil transmission, aircraft propulsion, vehicle engines and stationery power plants.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

I claim:

1. A ring-shaped compliant support for a gas turbine engine, comprising:
   an annular case; and
   an adjustment member that will turn relative to the annular case if exposed to thermal energy, wherein the adjustment member comprises a first array of wings extending radially and circumferentially from the ring, and a second array of wings extending radially and circumferentially from the ring, wherein the wings in the first array are axially thinner than the wings in the second array, and the wings in the first array are upstream from the wings in the second array.

2. The ring-shaped compliant support of claim 1, wherein the annular case defines a bore and the adjustment member is received within the bore.

3. The ring-shaped compliant support of claim 1, wherein slots in the adjustment member separate the plurality of wings from each other.

4. The ring-shaped compliant support of claim 1, wherein the first array of wings are axially sequentially aligned with the second array of wings.

5. The ring-shaped compliant support of claim 1, wherein the wings in the first array are insulated relative to the wings in the second array, and the wings in the second array are uninsulated relative to the wings in the first array.

6. A ring-shaped compliant support for a gas turbine engine, comprising:
   an annular case; and
   an adjustment member that will turn relative to the annular case if exposed to thermal energy, the adjustment member comprises a first array of wings extending radially and circumferentially from the ring, and a second array of wings extending radially and circumferentially from the ring, the wings in the first array axially spaced from the wings in the second array, wherein the wings in the first and second arrays elongate in response to thermal variations.

7. The ring-shaped compliant support of claim 1, wherein the adjustment member and the annular case have different rates of thermal expansion, such that the adjustment member expands more quickly than the annular case in response to thermal energy.

8. The ring-shaped compliant support of claim 6, wherein the rings in the first array are axially thinner than the rings in the second array.

9. The ring-shaped compliant support of claim 6, wherein the rings in the first array are axially upstream from the rings in the second array.

10. A ring-shaped compliant support, comprising:
an annular case;
an adjustment member having a ring, a first array of wings, and a second array of wings that is axially spaced from the first array, the first and second array of wings extending radially and circumferentially from the ring; and
a gas turbine engine component configured to turn with the adjustment member or the annular case relative to the other of the adjustment member or the annular case in response to thermal energy.

11. The ring-shaped compliant support of claim 10, wherein the gas turbine engine component is a blade outer air seal.

12. The ring-shaped compliant support of claim 10, wherein the gas turbine engine component is secured to the adjustment member and is radially inside both the annular case and the adjustment member.

13. The ring-shaped compliant support of claim 10, wherein the wings in the first and second arrays elongate in response to thermal variations, the elongating of the wings in the first array, the wings in the second array, or both turning the adjustment member or the annular case relative to the other of the adjustment member or the annular case.

14. The ring-shaped compliant support of claim 10, wherein the wings in the first array are axially thinner than the wings in the second array.

15. The ring-shaped compliant support of claim 10, wherein the wings in the first array are upstream from the wings in the second array.

16. The ring-shaped compliant support of claim 10, wherein the second array of wings is axially spaced from the wings in the first array to provide a gap axially between the first and second arrays of wings.

17. The ring-shaped compliant support of claim 10, wherein the rings in the first array are axially thinner than the rings in the second array.

18. The ring-shaped compliant support of claim 10, wherein the rings in the first array are axially upstream from the rings in the second array.

\* \* \* \* \*